(12) United States Patent
Haikney et al.

(10) Patent No.: US 9,075,994 B2
(45) Date of Patent: *Jul. 7, 2015

(54) PROCESSING ATTESTATION DATA ASSOCIATED WITH A PLURALITY OF DATA PROCESSING SYSTEMS

(75) Inventors: David Haikney, Manchester (GB); David N. Mackintosh, Manchester (GB); Jose J. P. Perez, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,080

(22) Filed: Apr. 30, 2012

(65) Prior Publication Data

US 2012/0216255 A1 Aug. 23, 2012

Related U.S. Application Data

(63) Continuation of application No. 13/289,044, filed on Nov. 4, 2011, now abandoned.

(30) Foreign Application Priority Data

Nov. 18, 2010 (EP) .................................... 10191669

(51) Int. Cl.
*G06F 21/57* (2013.01)
*G06F 9/455* (2006.01)
*G06F 9/44* (2006.01)

(52) U.S. Cl.
CPC .......... *G06F 21/57* (2013.01); *G06F 2221/034* (2013.01); *G06F 2009/45587* (2013.01); *G06F 9/4401* (2013.01)

(58) Field of Classification Search
CPC ..... G06F 21/57; G06F 21/577; G06F 21/575; G06F 21/51; G06F 21/64; G06F 2221/034; G06F 9/455; G06F 9/45558; G06F 2009/45587; H04L 9/3236

USPC ........ 713/187, 189, 193, 164, 168; 726/3, 22, 726/26; 718/1

See application file for complete search history.

(56) References Cited

U.S. PATENT DOCUMENTS 6,539,480 B1 3/2003 Drews
6,546,392 B1 4/2003 Bahlmann (Continued)

FOREIGN PATENT DOCUMENTS

EP 1980970 A2 10/2008
WO WO2012038211 A1 3/2012

OTHER PUBLICATIONS

"TCG Specification Architecture Overview", Specification Revision 1.4. Aug. 2, 2007. 54 pgs.*

(Continued)

*Primary Examiner* — Zachary A Davis
(74) *Attorney, Agent, or Firm* — Yee & Associates, P.C.; Jeffrey S. LaBaw (57) ABSTRACT

An attestation technique is provided for processing attestation data associated with a plurality of data processing systems. A first data processing system is operable for receiving a request for attestation from a requester. In response to receiving the request, the first data processing system is further operable for retrieving a list of one or more children, wherein the one or more children include the second data processing system; retrieving and storing attestation data associated with each of the one or more children; retrieving and storing attestation data associated with the first data processing system; and sending to the requester a concatenated response containing the attestation data associated with the first data processing system and the child attestation data associated with the one or more children.

17 Claims, 10 Drawing Sheets

(56) References Cited

U.S. PATENT DOCUMENTS

| | | | |
|---|---|---|---|
| 7,191,464 B2 | 3/2007 | Cromer et al. | |
| 7,222,062 B2* | 5/2007 | Goud et al. | 703/23 |
| 7,275,263 B2 | 9/2007 | Bajikar et al. | |
| 7,313,679 B2* | 12/2007 | Ranganathan | 713/1 |
| 7,380,119 B2* | 5/2008 | Bade et al. | 713/155 |
| 7,480,804 B2* | 1/2009 | Bade et al. | 713/181 |
| 7,613,921 B2 | 11/2009 | Scaralata | |
| 7,840,801 B2* | 11/2010 | Berger et al. | 713/164 |
| 7,921,286 B2 | 4/2011 | Wooten | |
| 7,953,778 B2 | 5/2011 | McKenney et al. | |
| 8,042,190 B2* | 10/2011 | Sahita et al. | 726/27 |
| 8,060,934 B2 | 11/2011 | Cabuk et al. | |
| 8,151,262 B2* | 4/2012 | Challener et al. | 718/1 |
| 8,201,216 B2 | 6/2012 | Cha et al. | |
| 8,433,924 B2* | 4/2013 | Challener et al. | 713/189 |
| 8,499,161 B2* | 7/2013 | Cha et al. | 713/178 |
| 8,522,018 B2* | 8/2013 | Molina et al. | 713/168 |
| 8,549,288 B2* | 10/2013 | Bade et al. | 713/166 |
| 2002/0194482 A1 | 12/2002 | Griffin et al. | |
| 2005/0138161 A1 | 6/2005 | McDaniel et al. | |
| 2006/0136708 A1 | 6/2006 | Hajji et al. | |
| 2008/0046581 A1 | 2/2008 | Molina et al. | |
| 2008/0178176 A1 | 7/2008 | Berger et al. | |
| 2008/0183767 A1 | 7/2008 | Zhu et al. | |
| 2008/0235754 A1 | 9/2008 | Wiseman et al. | |
| 2008/0244569 A1 | 10/2008 | Challener et al. | |
| 2008/0281654 A1 | 11/2008 | Carter et al. | |
| 2008/0282348 A1 | 11/2008 | Proudler et al. | |
| 2009/0125352 A1 | 5/2009 | Miyake et al. | |
| 2009/0125716 A1 | 5/2009 | Wooten | |
| 2009/0204964 A1 | 8/2009 | Foley et al. | |
| 2009/0328022 A1 | 12/2009 | Brogan et al. | |
| 2010/0083002 A1 | 4/2010 | Cui et al. | |
| 2010/0281273 A1 | 11/2010 | Lee et al. | |
| 2012/0084549 A1 | 4/2012 | Mackintosh et al. | |
| 2012/0131334 A1 | 5/2012 | Haikney et al. | |
| 2013/0080756 A1 | 3/2013 | MacKintosh et al. | |
| 2013/0212369 A1 | 8/2013 | Imtiaz et al. | |

OTHER PUBLICATIONS

USPTO Non-Final Office Action, U.S. Appl. No. 13/241,835, Jan. 29, 2013, 11 pages.

Chun et al., "Decentralized Trust Management and Accountability in Federated Systems", Proceedings of the 37th Annual Hawaii International Conference on Systems Sciences, Jan. 2004, 9 pages.

Griffin et al., "Trusted Virtual Domains: Toward Secure Distributed Services", Proceedings of the First Workshop on Hot Topics in System Dependability, Jun. 2005, 6 pages.

Mackintosh et al., "Attesting a Component of a System During a Boot Process," U.S. Appl. No. 13/459,164, filed Apr. 28, 2012, 25 pages.

"TCG Infrastructure Working Group Architecture Part II—Integrity Management", Specification Version 1.0, Revision 1.0, Nov. 2006, 4 pages.

"TCG Specification Architecture Overview", Specification Revision 1.4, Aug. 2007, 4 pages.

USPTO Final Office Action, U.S. Appl. No. 13/241,835, Jun. 18, 2013, 17 pages.

USPTO Non-Final Office Action, U.S. Appl. No. 13/289,044, Apr. 4, 2013, 17 pages.

USPTO Non-Final Office Action, U.S. Appl. No. 13/459,164, Apr. 12, 2013, 12 pages.

Xu et al., "DR@FT: Efficient Remote Attestation Framework for Dynamic Systems," Sep. 2010, Computer Security A Esorics 2010, Springer Berlin Heidelberg, 16 pages.

Jie et al., "A Privacy-Preserving Integrity Measurement Architecture," 2010 Third International Symposium on Electronic Commerce and Security (ISECS), IEEE, Jul. 2010, pp. 242-246 (abstract).

PCT search report dated Feb. 1, 2012 regarding applicatyion PCT/EP2011/064979, international filed Aug. 31, 2011, applicant International Business Machines Corporation, 4 pages.

Imtiaz et al., "Attesting Use of an Interactive Component During a Boot Process," U.S. Appl. No. 13/820,039, filed Feb. 28, 2013, 35 pages.

Haikney et al., "Techniques for Attesting Data Processing Systems," U.S. Appl. No. 13/988,051, and Preliminary Amendment, filed Jul. 29, 2013, 36 pages.

Haikney et al., "Techniques for Attesting Data Processing Systems," U.S. Appl. No. 14/042,267, filed Sep. 30, 2013, 30 pages.

Final Office Action, dated Sep. 27, 2013, regarding U.S. Appl. No. 13/459,164, 31 pages.

Final Office Action, dated Oct. 22, 2013, regarding U.S. Appl. No. 13/289,044, 23 pages.

Office Action, dated Jan. 9, 2014, regarding U.S. Appl. No. 13/241,835, 24 pages.

Notice of Allowance dated Jun. 16, 2014, regarding U.S. Appl. No. 13/241,835, 11 pages.

* cited by examiner

FIG. 1

Background

Background

Background

FIG. 4  Background

PROCESSING ATTESTATION DATA ASSOCIATED WITH A PLURALITY OF DATA PROCESSING SYSTEMS

CROSS-REFERENCE TO RELATED APPLICATION(S)

This application is a continuation of and claims the benefit of priority to U.S. patent application Ser. No. 13/289,044, filed on Nov. 4, 2011 and entitled "Method for Attesting a Plurality of Data Processing Systems", which claims the benefit of priority to United Kingdom Patent Application Serial No. 10191669.0, filed on Nov. 18, 2010, the contents of which are hereby incorporated by reference.

BACKGROUND

1. Field

The present invention relates to a method for attesting a plurality of data processing systems.

2. Description of the Related Art

Trusted boot is a process for booting and establishing a chain of trust in a computing system. With reference to the environment (100) of FIG. 1, for example, a system administrator takes delivery of a server (a managed system (120)) and proceeds to install system software. The managed system (120) comprises a secure device (125), e.g. a TPM (Trusted Platform Module). Once the system (120) is configured and booting, each component (hardware and/or software) of the managed system (120) cryptographically measures another component and can "extend" (but not directly write to) a measurement value into a Platform Configuration Register (PCR) of the TPM (125). Each component is also operable to access an event log in order to write data associated with the measurement of a component into an entry associated with the event log.

Figure 1:
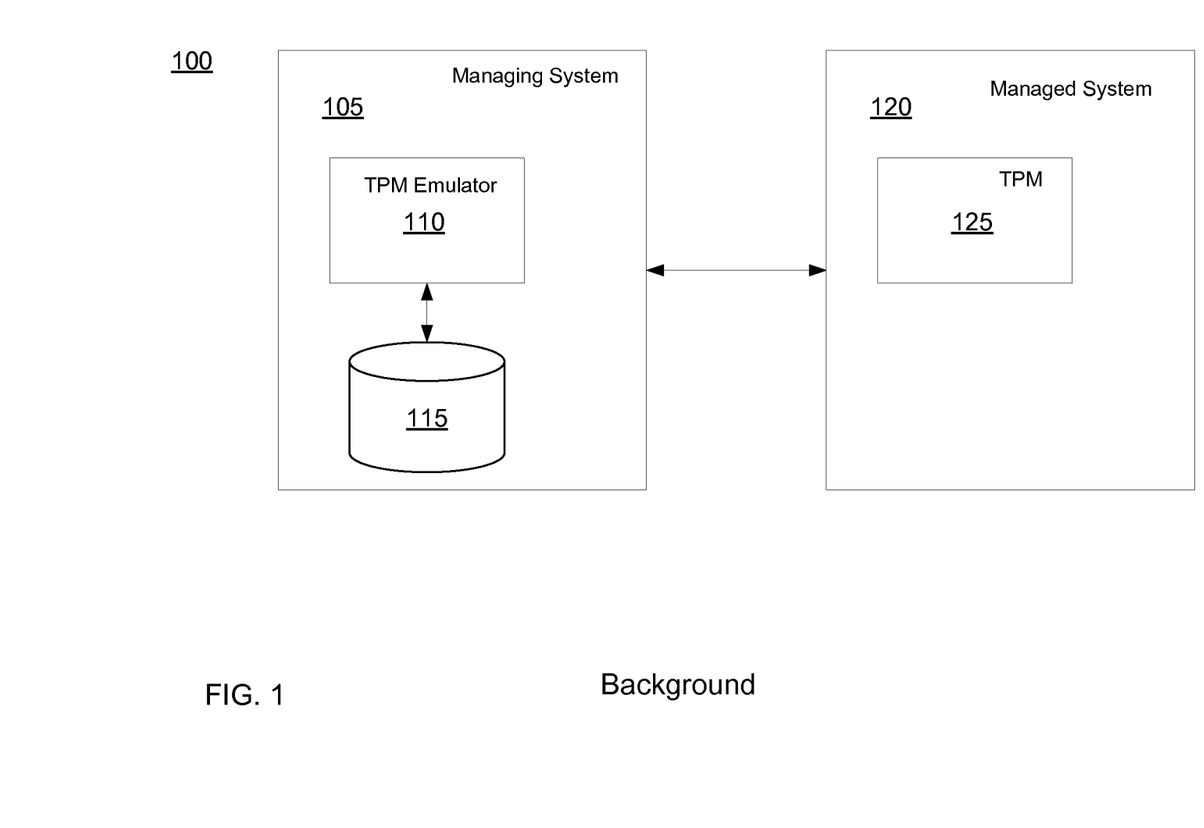
FIG. 1 is a block diagram showing a known system for carrying out trusted boot and remote attestation processes.

The measurements can be remotely attested by a managing system (105) which has a database (115) to store expected attestation values for components of each managed system. The values would typically be stored along with some metadata describing what the values mean. The managing system (105) comprises a TPM emulator (110) for e.g., comparing the measurements with the values. If there is no match between the measurements and the values, typically, the managing system (105) further has to compare the measurements against a (large) list (e.g., a reference manifest) of measurement values provided by manufacturers of components. Typically, a reference manifest comprises a large number of measurement values associated with each component of a managed system (120) and these measurement values can be taken to be "trusted".

The remote attestation process itself may be initiated by either the managing or managed system.

Changes to the managed system (120) can be detected by subsequent trusted boot and remote attestation processes.

The above processes are described, for example, in section 4 of the Trusted Computing Group (TCG) Specification Architecture Overview; Specification; Revision 1.4; 2 Aug. 2007 and section 2 of the TCG Infrastructure Working group Architecture Part II—Integrity Management; Specification Version 1.0; Revision 1.0; 17 Nov. 2006.

As described above, attestation is currently concerned with verifying a single machine, be it a physical machine with a real TPM or a virtual machine (VM) with a virtual TPM. This is a reasonable approach for owners of individual machines but typically, an end-user or corporation may deal in a granularity much larger than a single machine. For example a large corporation may wish to attest each of its VMs on a particular physical machine, or each of its VMs within a particular machine pool or each of its physical machines at a particular site. Similarly, datacenter owners may care about the integrity of their entire datacenter (and possibly sub-clusters within it). Instead of single machines, an entity may be concerned with tens, hundreds or even thousands of machines.

SUMMARY

According to a first aspect, there is provided a method for attesting a plurality of data processing systems, comprising the steps of: configuring a chain of data processing systems wherein a first data processing system is responsible for retrieving attestation data associated with a second data processing system; sending a request for attestation of the first data processing system; in response to receiving the request, retrieving, by the first data processing system, a list of one or more children, wherein the one or more children comprise the second data processing system; retrieving and storing, by the first data processing system, attestation data associated with each of the one or more children; retrieving and storing, by the first data processing system, attestation data associated with the first data processing system; and sending to the requester, by the first data processing system, a concatenated response containing the attestation data associated with the first and second data processing systems, such that the attestation data associated with the first and second data processing systems can be used to attest the first and second data processing systems respectively.

According to a second aspect, there is provided an apparatus for attesting a plurality of data processing systems, comprising: means for configuring a chain of data processing systems wherein a first data processing system is configurable to be responsible for retrieving attestation data associated with a second data processing system; means for sending a request for attestation of the first data processing system; means, in response to receipt of the request, for retrieving, by the first data processing system, a list of one or more children, wherein the one or more children comprise the second data processing system; means for retrieving and storing, by the first data processing system, attestation data associated with each of the one or more children; means for retrieving and storing, by the first data processing system, attestation data associated with the first data processing system; and means for sending to the requester, by the first data processing system, a concatenated response containing the attestation data associated with the first and second data processing systems, such that the attestation data associated with the first and second data processing systems can be used to attest the first and second data processing systems respectively.

According to a third aspect, there is provided a computer program product comprising computer program code stored on a computer readable medium, wherein the computer program code is operable to, when loaded into a computer system and executed thereon, cause said computer system to perform all the steps of a method according to the method described above.

The present invention provides a mechanism in which the status of individual datacenter components can be obtained and coalesced such that e.g., an attestation result associated with a plurality of machines can be provided.

BRIEF DESCRIPTION OF THE SEVERAL VIEWS OF THE DRAWINGS

The present invention will now be described, by way of example only, with reference to preferred embodiments thereof, as illustrated in the following drawings.

DETAILED DESCRIPTION

A more detailed explanation of known trusted boot and remote attestation processes will now be given.

Figure 2:
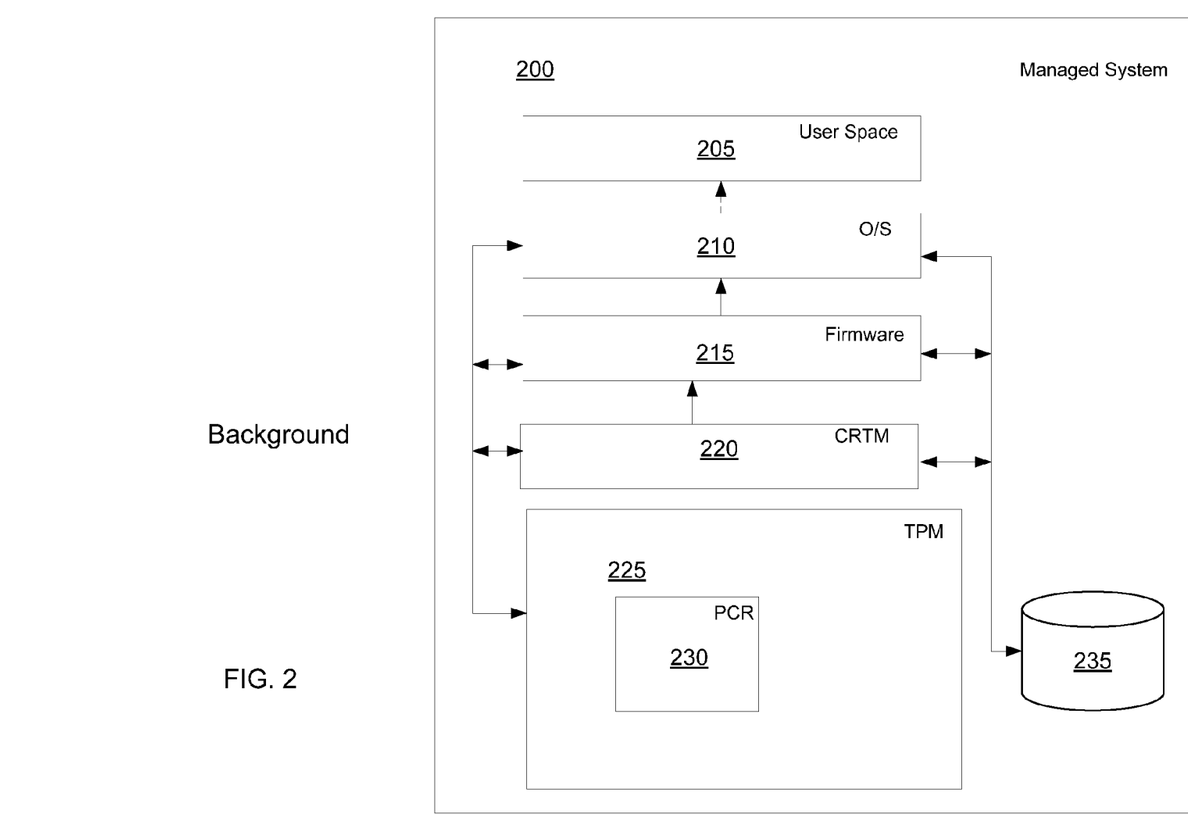
FIG. 2 is a block diagram showing the components of a known managed system.

With reference to FIG. 2, there is shown a managed system (200) in more detail. During a trusted boot process, each component of the managed system (200) cryptographically measures (e.g., using Secure Hash Algorithm (SHA) to create a hash of information such as a software file; a model; make; serial number of a component etc. in order to create a measurement value) another boot component.

In an example, a Core Root of Trust for Measurement (CRTM) component (220), for example, BIOS, is the first piece of code which is given control during boot and must be implicitly trusted as it is immutable. The CRTM (220) cryptographically measures the next component in the boot process (e.g., firmware (215)); subsequently the firmware (215) measures the next component in the boot process (e.g., an operating system (210)); and subsequently the operating system (210) measures any user space programs (205) before control is transferred to the user space program (205).

Each component can "extend" (but not directly write to) a measurement value into a Platform Configuration Register (PCR) (230) of a TPM (225) before control is transferred to the measured component. An extend operation comprises a cryptographic combination of a current value of the PCR (230) and a measurement value—it is signed with a public/private key pair of the managed system (200) whereby the private key is known only to the TPM (225).

Each component is also operable to access an event log (235) in order to write data associated with the measurement of a component (e.g., metadata such as a component identifier and an event; and an associated measurement value) into an entry associated with the event log (235).

Note that the CRTM (220) executes in a restricted environment where it can not typically access the event log (235). Note also that although a user space program (205) is operable to use the TPM (225) and the event log (235), it is optional as to whether it does so since the user space program (205) does not tend to load other software components itself.

Figure 3:
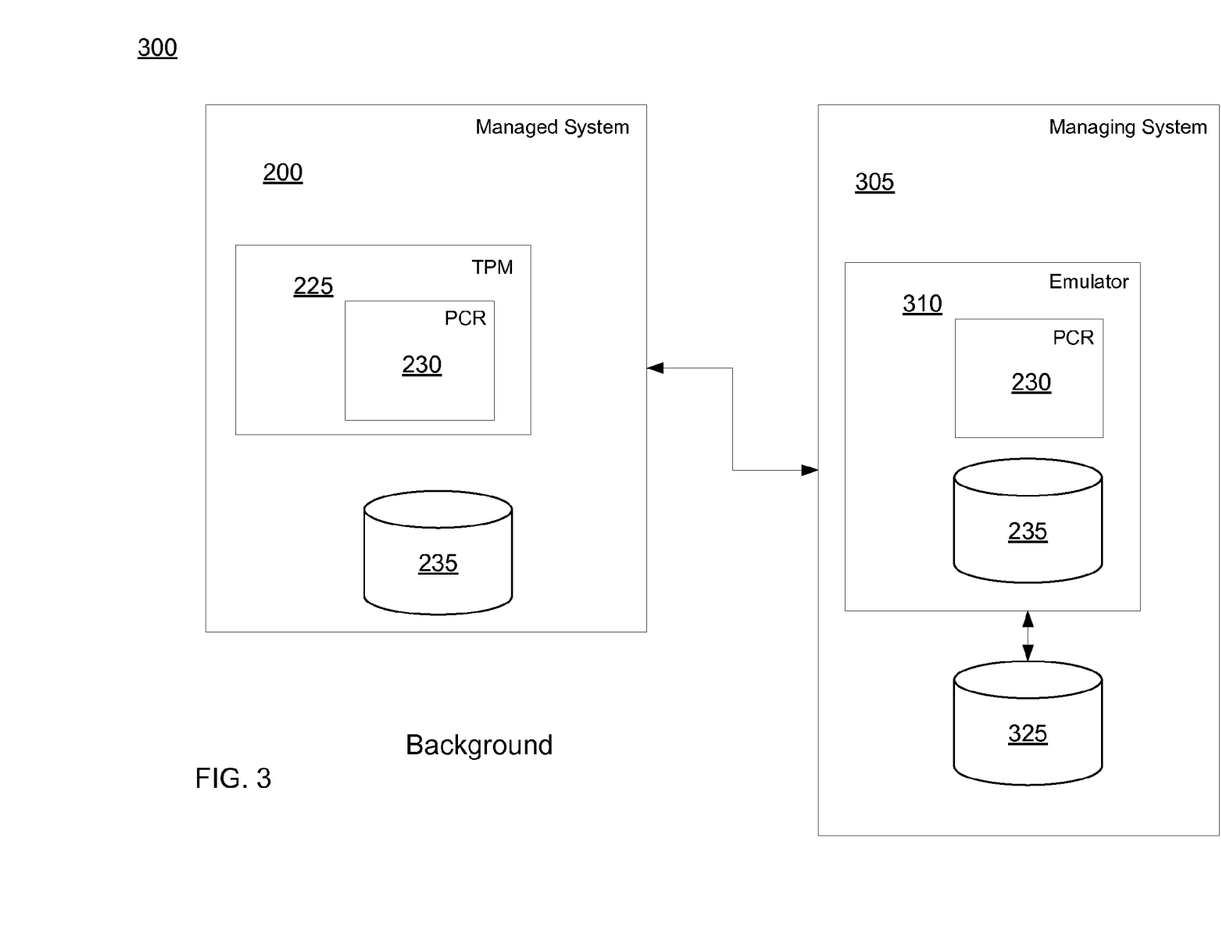
FIG. 3 is a block diagram showing a more detailed view of a known system for carrying out trusted boot and remote attestation processes.

Once the managed system (200) is running, data associated with a "chain of trust" can be extracted for inspection by a remote system (305) using a remote attestation procedure e.g. DAA (Direct Anonymous Attestation) as will be described herein.

With reference to the system (300) of FIG. 3, there is shown the managed system (200) and associated TPM (225); PCRs (230); and event log (235) comprising one or more measurement values and associated metadata. An attestation process typically involves the managed system (200) sending the current PCRs (230) for measured components together with the event log (235) to a managing system (305).

Figure 4:
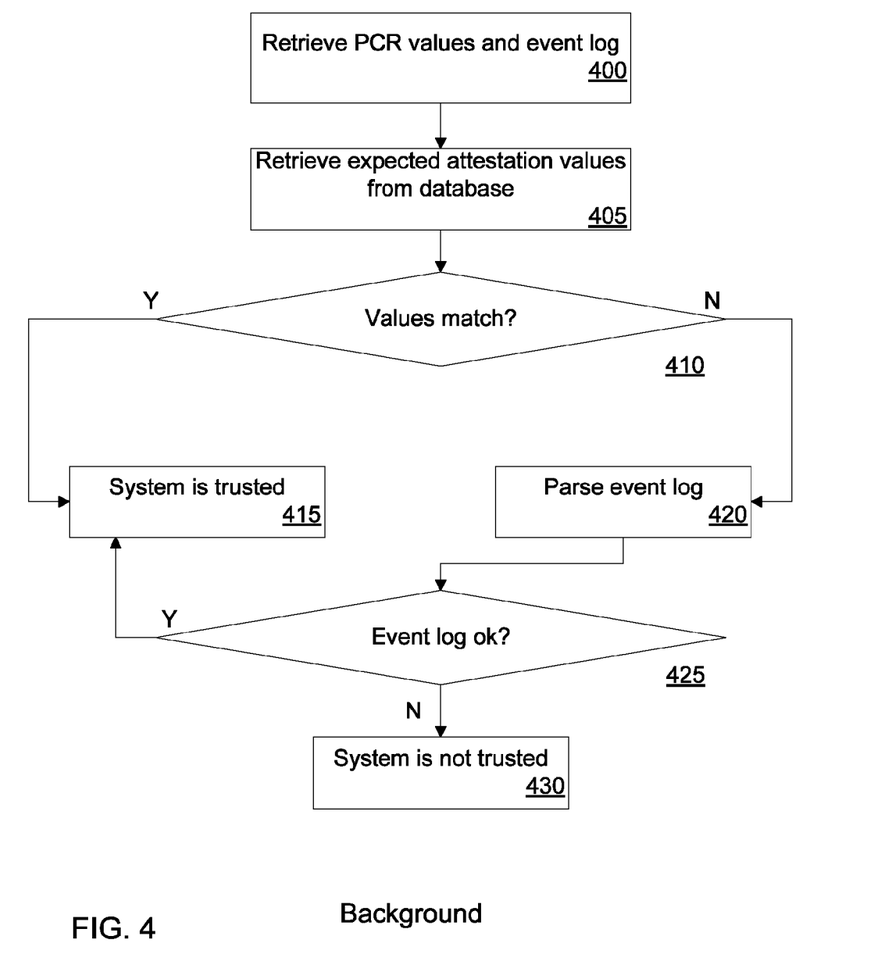
FIG. 4 is a flow chart showing the operational steps involved in a known remote attestation process.

A simplified example of an attestation process performed on the managing system (305) will now be described with reference to FIG. 4.

At step 400, the received current PCRs (230) together with the event log (235) are retrieved. At step 405, expected attestation values associated with components of the managed system (200) are retrieved from a database (325). At step 410, an emulator (310) of the managing system (305) compares the values of the received PCRs (230) with the expected attestation values. It should be understood that a number of other components of the managing system (305) could execute the comparison logic.

If a match occurs for each PCR value, the managed system (200) is considered to be trusted (step 415) and no further work is done.

If a match does not occur for each PCR value, the managing system (305) parses (step 420) the event log (235), inspecting each entry in turn to decide whether or not measurement value(s) contained in an entry associated with a measured component in question is valid.

If each event log (235) entry appears to be valid (positive result to step 425), the managed system (200) is considered to be trusted (step 415) and no further work is done.

If the event log entry appears not to be valid (negative result to step 425), the managed system (200) is not considered to be trusted (step 430)—preferably, a security alert is raised before moving to a "System untrusted" exit state.

An example implementation of the above process will now be described.

Typically, manufacturers of components of the managed system (200) provide a (large) list (e.g., a reference manifest) of measurement values associated with a component—these measurement values can be taken to be "trusted". Further, typically, the trusted boot process is highly deterministic and associated events which appear in the event log (235) follow a strict pattern. In an example where the CRTM (220) measures the firmware (215) which in turn measures the operating system (210), the event log (235) typically comprises two events, namely, "firmware measured" and "operating system measured". Even if the firmware (215) and/or the operating system (210) are changed (e.g., updated), during a future boot process, the same two events will occur in the same order and only the associated measurement values will differ.

In an example, each measurement value is associated with the same PCR. In the example, the managing system (305) keeps a record indicating that the last time the managed system (200) booted, it was using firmware, e.g., having version X with a measurement of M1 and an operating system, e.g., having version Y with a measurement of M2, where M1 and M2 are SHA digests of the firmware boot component and operating system boot component, respectively. The two events together with the measurement values, namely, "firmware measured: SHA(M1)" and "operating system measured: SHA(M2)", when extended into a PCR, give a PCR value of "Z". The PCR value of "Z" is recorded as an expected attestation value for the firmware (215) and the operating system (210) in the database (325) of the managing system (305).

During a subsequent attestation process, the managing system (305) retrieves (step 400) the received current PCRs (230) together with the event log (235) and retrieves (step 405) the expected attestation values from the database (325).

At step 410, the emulator (310) compares the values of the received PCRs with the expected attestation values—if a match occurs, it is determined (step 415) that the managed system (200) is using the expected firmware (215) and operating system (210).

If a match does not occur, (i.e., the received PCR value is not "Z"), the managing system (305) parses (step 420) the event log (235) to find associated entries. The managing system (305) compares the first event and measurement value, namely, "firmware measured: SHA(M1)" with a list of trusted values provided by the particular manufacturer of the firmware and compares the second event and measurement value, namely, "operating system measured: SHA(M2)" with a list of trusted values provided by the particular manufacturer of the operating system.

If either component has a measurement value which the manufacturer has not listed as "trusted", the managed system (200) is assumed (step 430) to be compromised.

If both components have a measurement value which the manufacturer has listed as "trusted", the managed system (200) is assumed (step 415) to be trusted and the measurement values can be associated with a new expected attestation value(s) that is used during the next attestation process of the managed system (200).

The present invention will now be described with reference to FIGS. 5, 6 and 7.

Figure 5A:
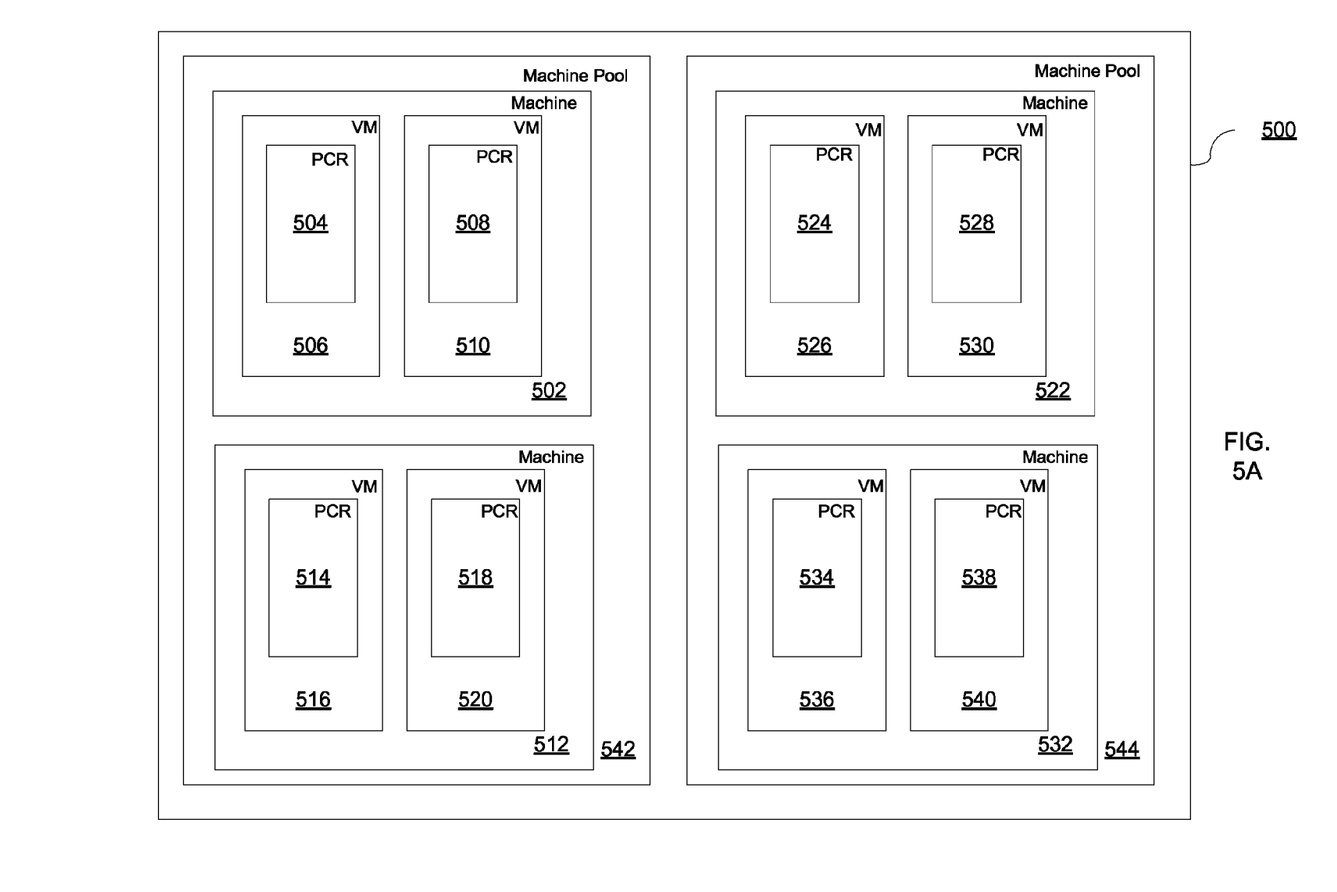
FIG. 5A is a block diagram showing a physical organization of machines within a typical datacenter.

FIG. 5A is a block diagram showing a physical organization of machines within a typical datacenter (500). In the example of FIG. 5A, the datacenter (500) comprises a plurality of machine pools (542 and 544), each of which comprises a plurality of machines (502, 512 and 522, 532 respectively). Each machine (502, 512, 522 and 532) comprises a plurality of virtual machines (VMs) (506 and 510, 516 and 520, 526 and 530, 536 and 540 respectively). Each virtual machine (506, 510, 516, 520, 526, 530, 536 and 540) comprises a plurality of PCRs (504, 508, 514, 518, 524, 528, 534 and 538 respectively).

Preferably, there is provided a means for generating an "attestation chain", whereby the managing system (305) requests attestation of what it perceives to be a single managed system and passes control to the system.

Preferably, such system is pre-configured to attest another system—a series of systems can be configured such that each one attests another system, resulting in an attestation chain of components. Note that each component can be e.g., an entire system/machine, and that each component represents a managed system.

Preferably, the results of attestation of the other component are stored in the attesting component (e.g., using the PCRs of the attesting component's TPM). Advantageously, this provides a certain degree of security.

Advantageously, the managing system (305) need not explicitly attest each of a plurality of managed systems.

In one implementation, an attestation chain can be created automatically. For example, software on the managing system (305) can enumerate every managed system which it knows about and can arrange the managed systems into a linear list. The software can then contact each member of the list and instruct it to use the next member of the list as a child in the attestation chain.

In another implementation, an attestation chain can be created manually. For example, a system administrator decides upon a way in which to organize the managed systems—in doing this, he/she would likely consider physical dependencies and/or functional dependencies of the managed systems. Following this step, the system administrator creates an attestation chain to mimic the organization. He/she can subsequently access each member of each chain and configure the member's list of children based on the attestation chain that has been created.

In yet another implementation, an attestation chain can be created using a combination of the above two approaches. For example, a system administrator can create a representation of an attestation chain using the managing system's (305) software e.g., using a Graphical User Interface (GUI) that depicts each managed system as an icon. The system administrator can connect the icons to represent parent/child relationships within an attestation chain. The software can subsequently automatically contact each member of the attestation chain and configure the member's list of children based on the representation created by the system administrator. This approach automates the most mechanical task (that of contacting each member of the attestation chain and configuring the member's list of children), whilst leaving the most semantically important task (that of creating a representation of an attestation chain) to the system administrator.

Preferably, details of an attestation chain are distributed and stored amongst the managed systems which participate in the chain, wherein each member of the attestation chain holds a list of its children—that is, each member of the chain must know its children. Additionally, software on the managing system (305) can also contain an internal representation of the attestation chain—this can serve many purposes, the most important one being convenience of information access for the system administrator.

Figure 5B:
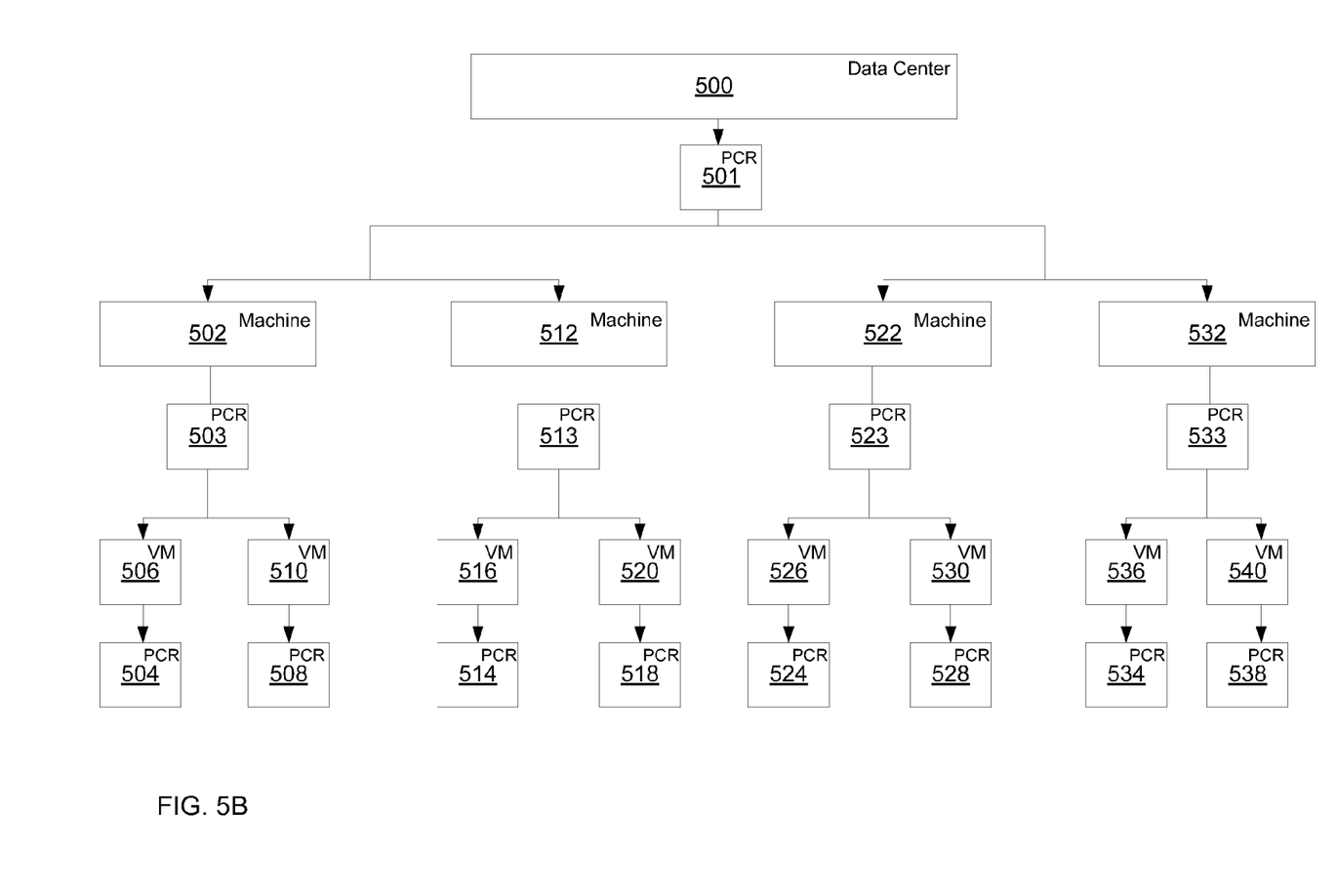
FIG. 5B is a block diagram showing a logical hierarchy of the physical organization of FIG. 5A.

With reference to FIG. 5B, an attestation chain can be associated with a physical hierarchy of a datacenter (500) configuration.

It should be understood that preferably, the implementation of an attestation chain requires that each participating component (virtual or physical) of the datacenter (500) is equipped with a TPM in order to store the results of attestation of another component.

Purely logical constructs, such as machine pools, may well have no physical counterpart and so cannot typically take part in chained attestation. Machine pools do not physically exist and are a method for management software to divide up a set of machines into logical groups. For example, the datacenter (500) can be associated with several physical rooms, each containing several machines. The management software may decide to create a "pool" for each room—the pool will contain all the machines in that particular room. If a fault occurs in a room (e.g., air conditioning failure), the administrator can select the pool corresponding to that room and shut down each of the machines it contains.

As such, FIG. 5B is an example that mirrors the physical hierarchy of the datacenter (500) as closely as possible.

FIG. 5B depicts the datacenter (500) and its associated PCRs (501); the plurality of machines (502, 512 and 522, 532 respectively) and their associated PCRs (503, 513, 523 and 533 respectively); and the plurality of VMs (506 and 510, 516 and 520, 526 and 530, 536 and 540 respectively) and their associated PCRs (504, 508, 514, 518, 524, 528, 534 and 538 respectively). Note that FIG. 5B does not depict the machine pools (542 and 544).

Figure 5C:
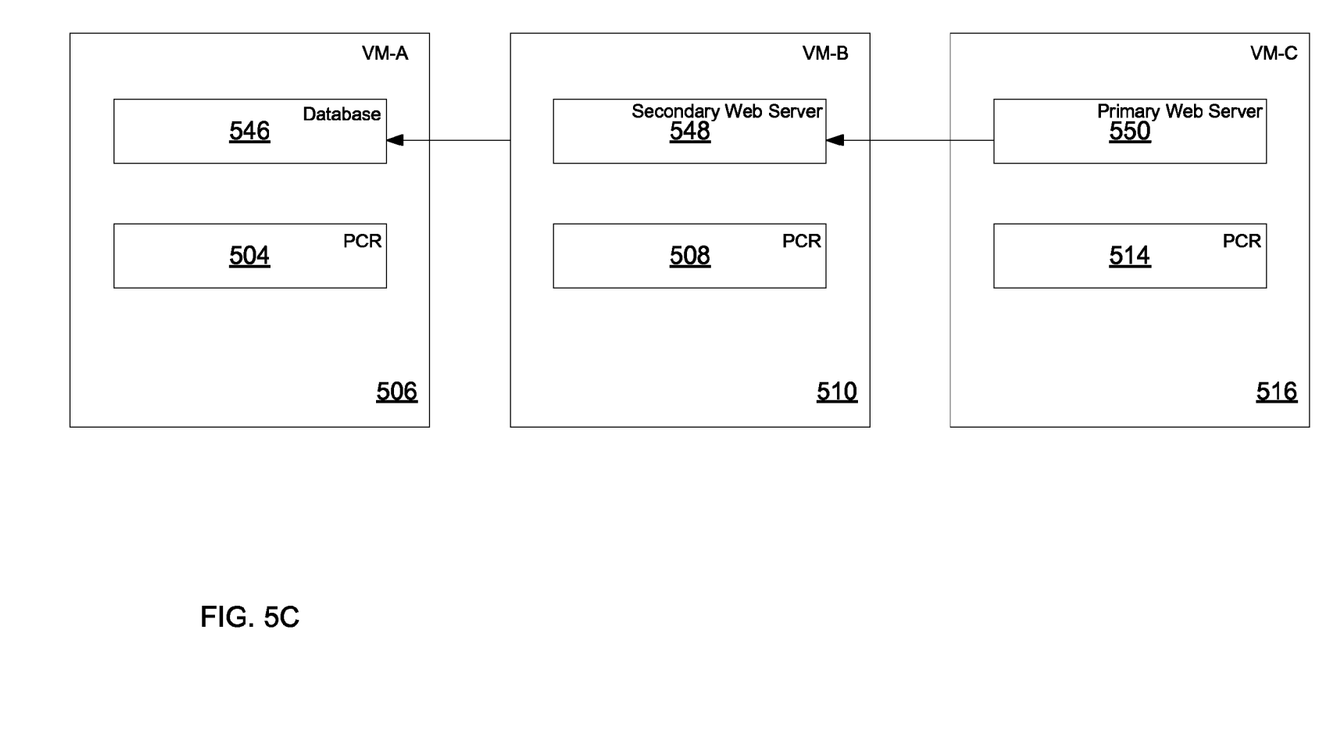
FIGS. 5C and 5D are block diagrams showing functional dependencies associated with components of the datacenter of FIG. 5A.
Figure 5D:
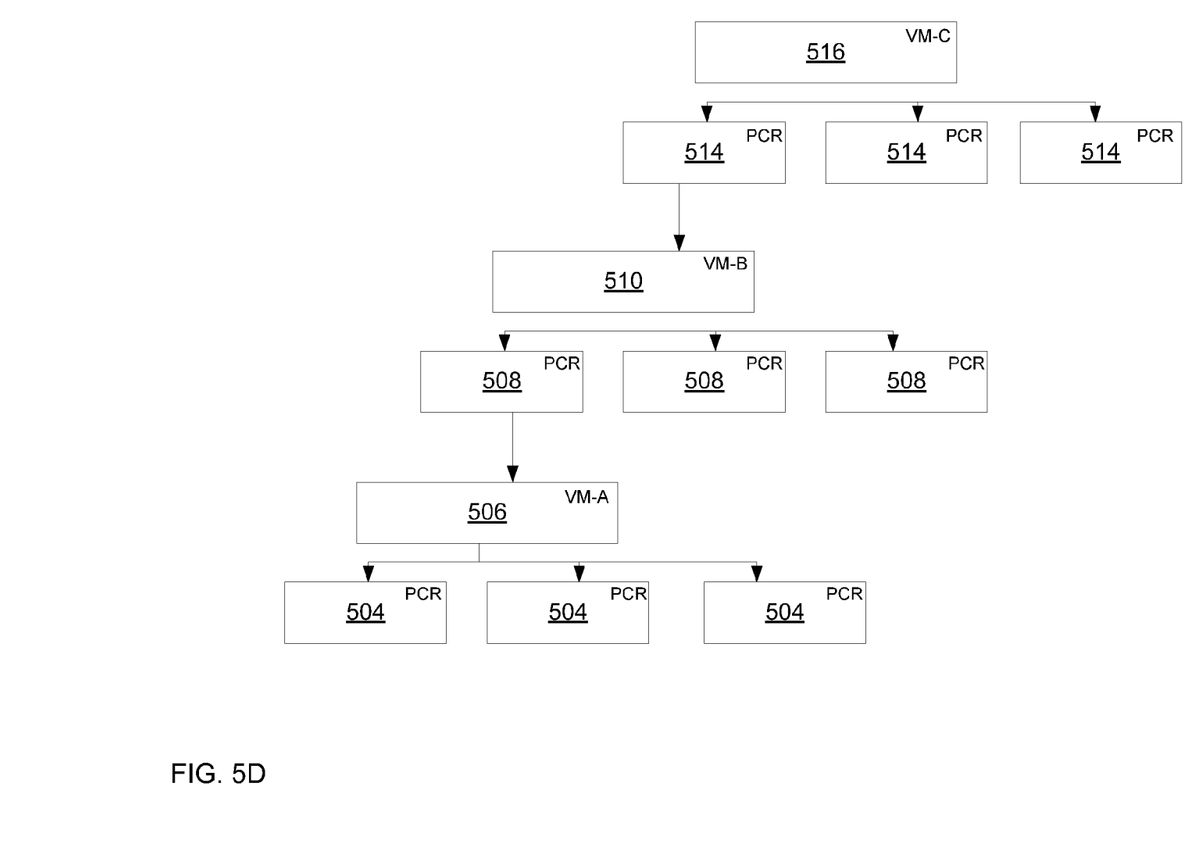

With reference to FIGS. 5C and 5D, an attestation chain can be associated with functional dependency of a datacenter rather than a physical hierarchy.

With reference to an example depicted in FIG. 5C, VM_A (506), VM_B (510) and VM_C (516) co-operate to provide a web service whereby the associated PCRs (504, 508 and 514, respectively) are also shown. VM_C hosts a primary webserver (550) which in turn hosts a website. The primary webserver (550) uses a secondary webserver (548) (e.g., hosted on VM_B) whenever a particular web page on the website is requested. The secondary webserver (548) uses a database (546) hosted on VM_A to retrieve information needed to display the web page. In this way, each VM is functionally dependant upon another.

With reference to FIG. 5D, a further depiction of functional dependency is shown whereby a VM is associated with its PCRs and whereby a trusted status of another VM is stored in the VM's TPM. The other VM is represented as a child of the VM. For example, VM_C is associated with its PCRs (514) and can store the trusted status of its child VM (VM_B). VM_B is associated with its PCRs (508) and can store the trusted status of its child VM (VM_A). VM_A is associated with its PCRs (504) and has no children.

A process of the preferred embodiment will now be described with reference to FIGS. 6 and 7.

In a worked example, the components associated with the functional dependency of FIG. 5D are to be attested.

At step 600, the managing system (305) (a top level requesting component) makes a request to attest a component of the datacenter (500) (a top level component in the chain, e.g., VM_C (516)) which from the point of view of the managing system (305), represents a managed system (200).

At step 605, a determination is made as to whether the component is configured to implement chained attestation.

There are a number of ways in which it can be determined whether the component is configured to implement chained attestation. For example, a component may not have the software required to perform chained attestation. It should be understood that such a component can still take part in an attestation chain provided that the component is an end point in the chain, that is, the component has no children.

In this case, VM_C is configured to implement chained attestation and the process passes to step 610, where VM_C receives the request for attestation. Responsively, VM_C retrieves (step 615) a list (List 1) of its children. With reference to FIG. 5D, VM_C has one child, namely, VM_B (510). Note that, if VM_C has no children, preferably, the process passes to step 630.

At step 620, a determination is made as to whether each of the children in the list (List 1) has been attested. As VM_B has not been attested, the process passes to step 625, where details of the unattested child are retrieved.

The process passes to step 600 where VM_C makes a request to attest VM_B (using a network connection, for example).

At step 605, a determination is made as to whether VM_B is configured to implement chained attestation. In this case, VM_B is configured to implement chained attestation and the process passes to step 610, where VM_B receives the request for attestation. Responsively, VM_B retrieves (step 615) a list (List 2) of its children. With reference to FIG. 5D, VM_B has one child, namely, VM_A (506).

At step 620, a determination is made as to whether each of the children in the list (List 2) has been attested. As VM_A has not been attested, the process passes to step 625, where details of the unattested child are retrieved.

The process passes to step 600 where VM_B makes a request to attest VM_A (using a network connection, for example).

At step 605, a determination is made as to whether VM_A is configured to implement chained attestation. In this case, VM_A is not configured to implement chained attestation and the process passes to another process depicted in FIG. 7.

At step 700, VM_A receives the request for attestation. Responsively, VM_A retrieves (step 705) its PCR values (504) and retrieves (step 710) its event log.

In an example, each component has two PCRs—one PCR (e.g., PCR0) is extended with the components' own measurement values and the other PCR (e.g., PCR1) is used to contain the results of attestation of the component's children. Examples of VM_A's PCR values (504) and event log are shown below—note that VM_A does not have any children:

EventLog_PCR0={Firmware_Measured: X, Operating-System_Measured: Y}
EventLog_PCR1={ }
PCR0=extend (extend(0,X), Y)
PCR1=0

At step 715, VM_A sends a response to the requesting system (VM_B) comprising the retrieved PCR values (504) and event log.

Figure 6:
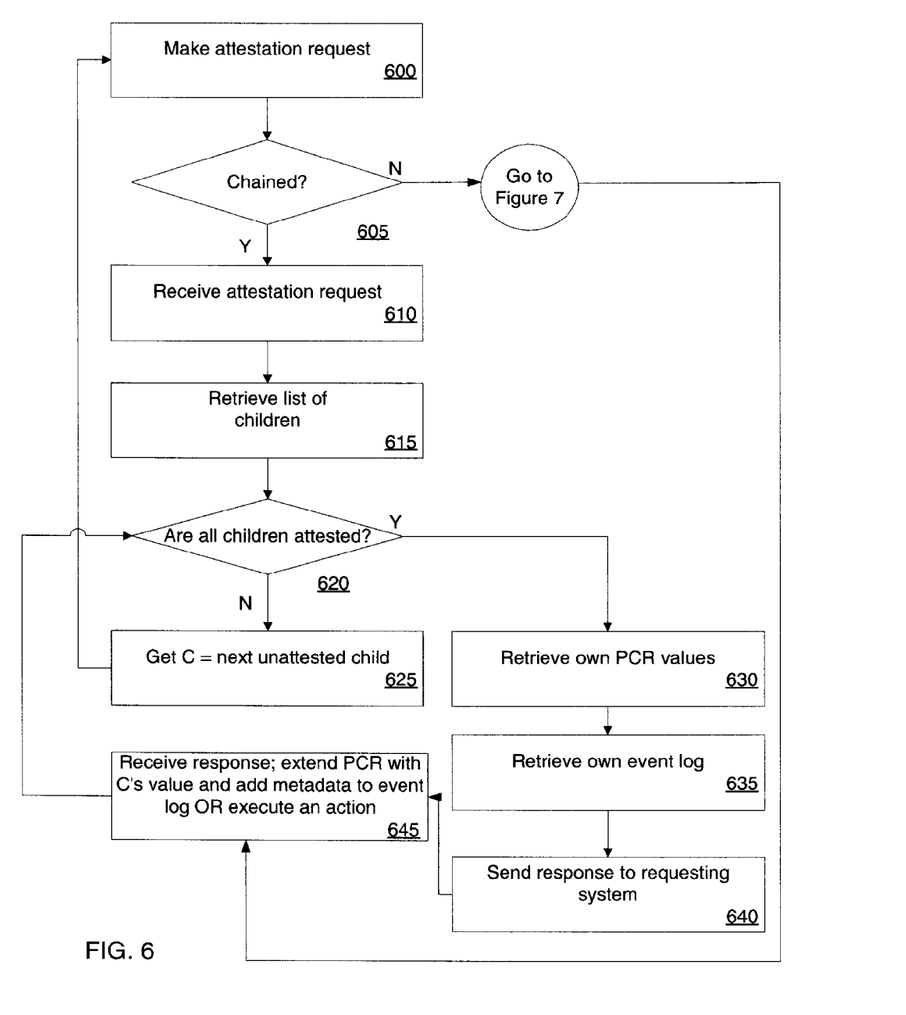
FIG. 6 is a flow chart showing the operational steps involved in an attestation process according to the preferred embodiment.
Figure 7:
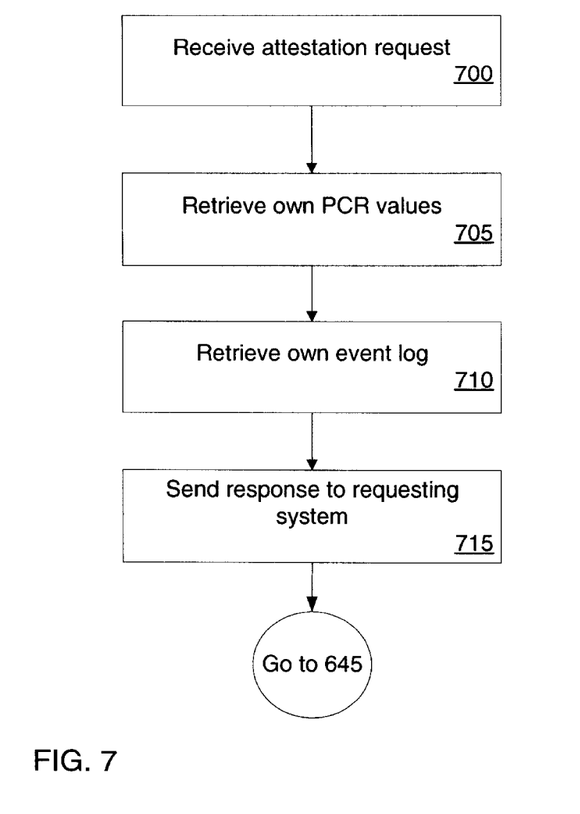
FIG. 7 is a flow chart showing the operational steps involved in a sub-process of the attestation of FIG. 6.

The process passes to step 645 of FIG. 6, where VM_B receives the PCR values (504) and event log of VM_A.

VM_B retrieves expected attestation values associated with VM_A retrieved from a database and a TPM of VM_B compares the values of the received PCRs (504) with the expected attestation values. It should be understood that any number of software components associated with VM_B can execute the comparison. If a match occurs for each PCR value, VM_A is considered to be trusted and no further work is done. If a match does not occur for each PCR value, VM_B parses the event log, inspecting each entry in turn to decide whether or not measurement value(s) contained in an entry associated with a measurement value(s) contained in an entry associated with the PCRs in question is valid (in accordance with a list of trusted values provided by a particular manufacturer). If each event log entry appears to be valid, VM_A is considered to be trusted and no further work is done. If the event log entry appears not to be valid, VM_A is not considered to be trusted.

In the example herein, VM_A is considered to be trusted.

With reference to step 645, VM_B "extends" values of the received PCRs (504) into e.g., a reserved set of its own PCRs (508) of its TPM. Further, VM_B writes data associated with measurement of VM_A into VM_B's event log.

Examples of VM_B's PCR values (508) and event log are shown below:

EventLog_PCR1={Attestation_Result: (VM_A=Trusted)}
PCR1=extend (0, SHA1(VM_A:=Trusted))

At step 620, a determination is made as to whether each of the children in the list (List 2) has been attested.

As each of the children in the list (List 2) has been attested, the process passes to step 630, where VM_B retrieves its PCR values (508) and retrieves (step 635) its event log.

Examples of VM_B's PCR values (508) and event log are shown below:

EventLog_PCR0={Firmware_Measured: A, Operating-System_Measured: B}
EventLog_PCR1={Attestation_Result: (VM_A=Trusted)}
PCR0=extend (extend(0, A), B)
PCR1=extend (0, SHA1(VM_A:=Trusted))

At step 640, VM_B sends a response to the requesting system (VM_C) comprising the retrieved PCR values (508) and event log.

Advantageously, when using chained attestation, before a component (e.g., VM_B) collects its own PCRs and event log it will attest any other component (e.g., VM_A) which is its "child" within the chain.

As above, VM_C retrieves expected attestation values associated with VM_B retrieved from a database and a TPM of VM_C compares the values of the received PCRs (508) with the expected attestation values in order to determine whether VM_B can be considered trusted.

Note that VM_B's PCRs (508) comprises the reserved set associated with the values of VM_A's PCRs (504). Thus, as well as VM_C receiving an indication of the state of VM_B's PCRs, an indication of the state of VM_A's PCRs is also received.

An expected attestation value of the reserved set preferably requires that each of the values of the reserved set must be "trusted". However, it should be understood that a number of other expected attestation values can be maintained.

In the example herein, VM_B is considered to be trusted (and note, VM_A has also been deemed trusted).

With reference to step 645, VM_C "extends" values of the received PCRs (508) into e.g., a reserved set of its own PCRs (514) of its TPM. Further, VM_C writes data associated with measurement of VM_B into VM_C's event log.

Examples of VM_C's PCR values (514) and event log are shown below:
EventLog_PCR1={Attestation_Result: (VM_B=Trusted)}
PCR1=extend (0, SHA1(VM_B:=Trusted))

At step 620, a determination is made as to whether each of the children in the list (List 1) has been attested.

As each of the children in the list (List 1) has been attested, the process passes to step 630, where VM_C retrieves its PCR values (514) and retrieves (step 635) its event log.

Examples of VM_C's PCR values (514) and event log are shown below:
EventLog_PCR0={Firmware_Measured: C, Operating-System_Measured: D}
EventLog_PCR1={Attestation_Result: (VM_B=Trusted)}
PCR0=extend (extend(0, C), D)
PCR1=extend (0, SHA1(VM_B: =Trusted))

At step 640, VM_C sends a response to the requesting system (the managing system (305)) comprising the retrieved PCR values (514) and event log.

As above, the managing system (305) retrieves expected attestation values associated with VM_C retrieved from a database and a TPM of the managing system (305) compares the values of the received PCRs (514) with the expected attestation values in order to determine whether VM_C can be considered trusted.

Note that VM_C's PCRs (514) comprise the reserved set associated with the values of VM_B's PCRs (508) and VM_B's PCRs (508) comprise the reserved set associated with the values of VM_A's PCRs (504). As such, attestation results of each component in a chain are propagated to the system which originally requested attestation, namely, the managing system (305).

In the example herein, VM_C is considered to be trusted (and note VM_B and VM_A have also been deemed trusted). As such, the managing system (305) has an indication of states associated with each component in a chain.

With reference to step 645, the managing system (305) need not have its own TPM and need not extend values of the received PCRs or write data into an event log. Thus, at step 645, the managing system (305) can execute some other action e.g., store indications of states associated with each component in a chain internally or display the indications to a user.

In this way, by making a single request of a managed system in the datacenter (500), the managing system (305) is able to obtain states associated with several machines.

As well as the above mechanism wherein a parent (e.g., VM_B) performs attestation of a child (e.g., VM_A) in the chain and writes the results in the parent's PCRs and event log, another option is for the parent to simply take the PCRs and event log of the child, concatenate them and write them directly to its own event log without attempting to interpret them. Eventually, a top level requesting component (e.g., the managing system (305)) will retrieve a response comprising the PCRs and event log of a top level component in the chain (wherein the response will also contain the PCRs and event log of each other component in the chain). Subsequently, the managing system (305) can itself compare the PCRs and event log of each other component in the chain.

The advantages of each component performing attestation of another component are that the workload of the attestation work (e.g., comparing PCRs against expected attestation values) is distributed throughout the datacenter. Furthermore, the result of each component within the chain is associated with "trusted" or "untrusted", meaning that the event logs of the components are not increased very much in size by the process.

The advantage of the managing system (305) performing attestation is that only the managing system (305) needs to hold the set PCRs and event log for each of the components in the chain since it will be the only one to interpret them. This reduces the complexity for all components within the chain. The disadvantage is that event logs will become progressively larger towards the top of the chain (since an event log of a component needs to contain the logs of each of its children).

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD- ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

What is claimed is:

1. A method for processing attestation data associated with a plurality of data processing systems comprising a first data processing system and a second data processing system, wherein the first data processing system comprises a first data processor coupled to a first memory and the second data processing system comprises a second data processor coupled to a second memory, the method comprising the steps of:
   receiving, by the first data processing system, a request for attestation from a requester;
   in response to receiving the request, retrieving, by the first data processor of the first data processing system, a list of one or more children of the first data processing system, wherein the one or more children comprise the second data processing system;
   in response to retrieving the list, retrieving and storing in the first memory, by the first data processor of the first data processing system, child attestation data associated with each of the one or more children including second data processing system attestation data of the second data processing system comprising the second data processor coupled to the second memory;
   retrieving, by the first data processor of the first data processing system, first attestation data associated with the first data processing system; and
   sending to the requester, by the first data processing system, a concatenated response containing the first attestation data associated with the first data processing system and the child attestation data associated with each of the one or more children.

2. The method of claim 1, further comprising:
   configuring an attestation chain of the plurality of data processing systems, wherein the attestation chain identifies the plurality of data processing systems to be attested, and wherein each data processing system member of the attestation chain holds a list of its children.

3. The method of claim 1, further comprising the step of:
   confirming, by the first data processing system, the child attestation data associated with each of the one or more children.

4. The method of claim 3, wherein the confirming is performed prior to the retrieving, by the first data processing system, the first attestation data associated with the first data processing system.

5. The method of claim 1, wherein the first attestation data associated with the first data processing system comprises a value maintained in a Platform Control Register (PCR) and an event log.

6. The method of claim 1, further comprising the step of:
   determining either a trusted state or an untrusted state for an associated PCR in accordance with an expected attestation value or a trusted value.

7. The method of claim 1, wherein the first data processing system uses the child attestation data to determine a trusted state of the second data processing system.

8. The method of claim 7, wherein the first data processing system stores the child attestation data in PCRs and an event log of the first data processing system.

9. The method of claim 1, wherein the requester is a managing system and uses the first attestation data associated with the first data processing system and the child attestation data associated with each of the one or more children to determine a trusted state of the first data processing system and the second data processing system, respectively.

10. The method of claim 9, wherein the managing system stores the child attestation data in PCRs and an event log of the managing system.

11. The method of claim 10, wherein the managing system stores an indication of a state associated with the first data processing system and second data processing system.

12. The method of claim 1, wherein the requester is a managing system that receives and stores the child attestation data associated with the one or more children.

13. The method of claim 1, wherein each data processing system of the plurality of data processing systems represents a managed system.

14. The method of claim 1, wherein the first data processing system further comprises a first trusted platform module (first TPM) and a second trusted platform module (second TPM), and wherein the first attestation data associated with the first data processing system is stored in the first TPM and the child attestation data is stored in the second TPM.

15. The method of claim 1, wherein the first data processing system further comprises a first trusted platform module (first TPM) and the second data processing system comprises a second trusted platform module (second TPM), and wherein the first attestation data associated with the first data processing system is stored in the first TPM and the child attestation data is stored in the second TPM.

16. The method of claim 1, wherein the first data processing system further comprises a trusted platform module (TPM), and wherein the child attestation data is stored in the TPM.

17. A method for processing attestation data associated with a plurality of data processing systems comprising a first data processing system and a second data processing system, wherein the first data processing system comprises a first data processor coupled to a first memory and the second data processing system comprises a second data processor coupled to a second memory, the method comprising the steps of:

- receiving, by the first data processing system, a first request for attestation from a requester;
- in response to receiving the first request, retrieving, by the first data processor of the first data processing system, a list of one or more children of the first data processing system, wherein the one or more children comprise the second data processing system;
- in response to retrieving the list, retrieving and storing in the first memory, by the first data processor of the first data processing system, child attestation data associated with each of the one or more children including second data processing system attestation data of the second data processing system comprising the second data processor coupled to the second memory;
- retrieving, by the first data processor of the first data processing system, first attestation data associated with the first data processing system;
- sending to the requester, by the first data processing system, a concatenated response containing the first attestation data associated with the first data processing system and the child attestation data associated with each of the one or more children;
- receiving, by the second data processing system, a second request for attestation from the first data processing system;
- in response to receiving the second request for attestation from the first data processing system, retrieving, by the second data processing system, a list of one or more second children of the second data processing system, wherein the one or more second children comprise a third data processing system comprising a third data processor coupled to a third memory;
- in response to retrieving the list of one or more second children of the second data processing system, retrieving and storing in the second memory, by the second data processing system, second child attestation data associated with each of the one or more second children; and
- retrieving and sending to the first data processing system storing, by the second data processing system, third attestation data associated with the second data processing system;
- wherein the first data processing system further comprises a first trusted platform module (first TPM) and a second trusted platform module (second TPM), and the second data processing system comprises a third trusted platform module (third TPM), and wherein the attestation data associated with the first data processing system is stored in the first TPM, the child attestation data is stored in the second TPM, and the third attestation data is stored in the third TPM.

* * * * *